(12) United States Patent
Tsai et al.

(10) Patent No.: US 9,035,885 B2
(45) Date of Patent: May 19, 2015

(54) OPTICAL INPUT APPARATUS

(71) Applicant: Sunrex Technology Corp., Taichung (TW)

(72) Inventors: Huo-Lu Tsai, Taichung (TW); Yung-Lung Liu, Taichung (TW)

(73) Assignee: Sunrex Technology Corp., Taichung (TW)

(*) Notice: Subject to any disclaimer, the term of this patent is extended or adjusted under 35 U.S.C. 154(b) by 70 days.

(21) Appl. No.: 13/948,821

(22) Filed: Jul. 23, 2013

(65) Prior Publication Data

US 2014/0168080 A1    Jun. 19, 2014

(30) Foreign Application Priority Data

Dec. 14, 2012  (TW) .............................. 101224262 U

(51) Int. Cl.
*G06F 3/02* (2006.01)
*G06F 3/01* (2006.01)
*G06F 3/0354* (2013.01)

(52) U.S. Cl.
CPC .............. *G06F 3/017* (2013.01); *G06F 3/0213* (2013.01); *G06F 3/03543* (2013.01); *G06F 3/03547* (2013.01)

(58) Field of Classification Search
USPC ......... 345/156, 158, 163, 166, 175, 168, 157, 345/170
See application file for complete search history.

(56) References Cited

U.S. PATENT DOCUMENTS

| | | | |
|---|---|---|---|
| 7,916,120 B2* | 3/2011 | Tiphane et al. | 345/156 |
| 2003/0028688 A1* | 2/2003 | Tiphane et al. | 710/1 |
| 2009/0073122 A1* | 3/2009 | Hou et al. | 345/163 |
| 2010/0182238 A1* | 7/2010 | Chen | 345/166 |
| 2013/0265218 A1* | 10/2013 | Moscarillo | 345/156 |
| 2013/0328833 A1* | 12/2013 | Hsieh et al. | 345/175 |

* cited by examiner

*Primary Examiner* — Thuy Pardo

(57) ABSTRACT

An optical input apparatus is provided and includes an input device for providing data and control signals to a computer; and at least one object sensing module disposed on a top of the input device and each including an optical sensor and a light source. The light source is capable of emitting light upward divergently to create a virtual sensing space above.

1 Claim, 3 Drawing Sheets

OPTICAL INPUT APPARATUS

BACKGROUND OF THE INVENTION

1. Field of the Invention

The invention relates to computer input devices and more particularly to an optical input apparatus.

2. Description of Related Art

Computers are widely used by people through out the world. In computing, an input device is any peripheral used to provide data and control signals to, for example, a computer. Examples of input devices include keyboards, mice, scanner, digital cameras, and joysticks.

There is a typical touch panel comprising a transparent capacitive sensing medium adapted to detect multiple touches that occur at a same time and at distinct locations on a plane of the touch panel and to produce distinct signals representative of a location of the touches on the plane of the touch panel for each touch wherein the transparent capacitive sensing medium includes a first layer having a plurality of transparent first conductive lines electrically isolated from one another; and a second layer spatially separated from the first layer and having a plurality of transparent second conductive lines electrically isolated from one another, the second conductive lines being positioned transverse to the first conductive lines, the intersection of transverse lines being positioned at different locations on the plane of the touch panel, each second conductive line being operatively coupled to a capacitive monitoring circuitry; and wherein the capacitive monitoring circuitry is adapted to detect changes in charge coupling between the first and second conductive lines Notwithstanding the prior art, the invention is neither taught nor rendered obvious thereby.

SUMMARY OF THE INVENTION

It is therefore one object of the invention to provide an optical input apparatus optical input apparatus comprising an input device for providing data and control signals to a computer; and at least one object sensing module disposed on a top of the input device and each including an optical sensor and a light source; wherein the light source is capable of emitting light upward divergently to create a virtual sensing space above.

The above and other objects, features and advantages of the invention will become apparent from the following detailed description taken with the accompanying drawings.

DETAILED DESCRIPTION OF THE INVENTION

Figure 1:
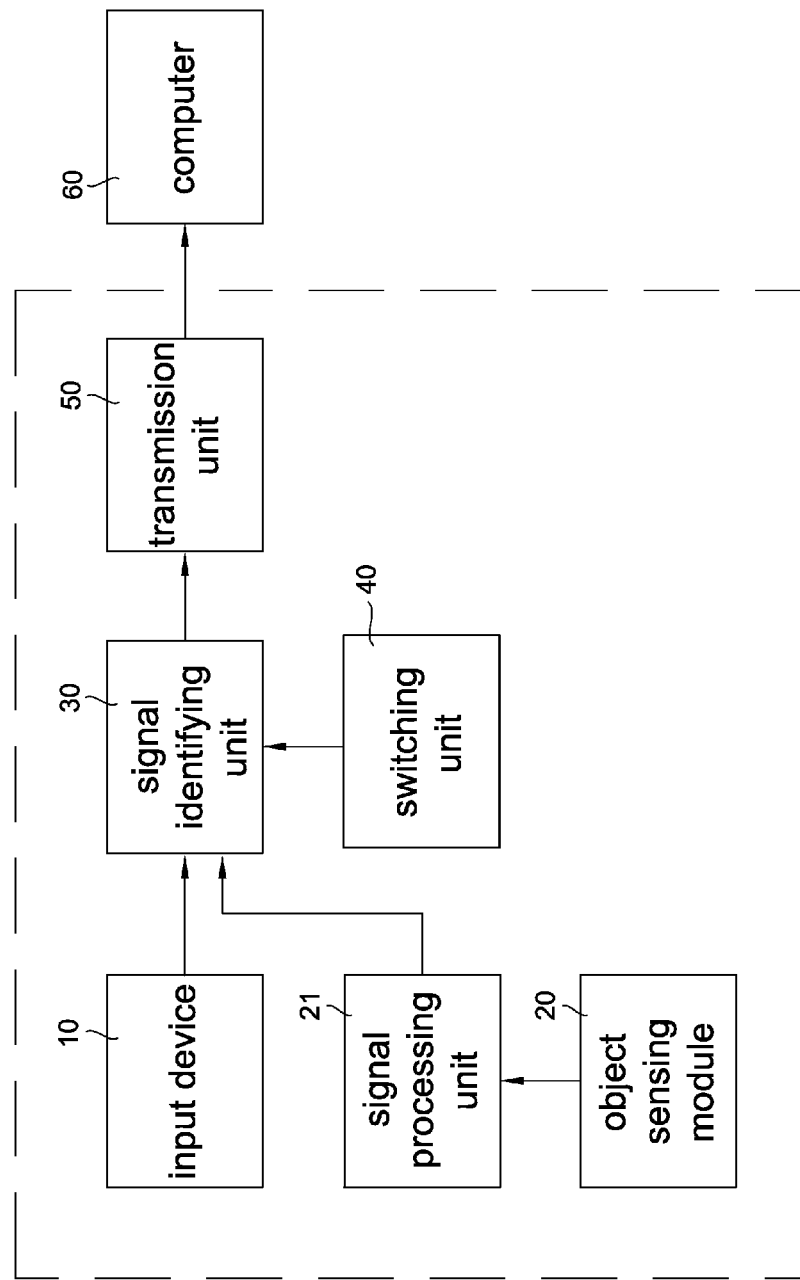
FIG. 1 is a block diagram of an optical input apparatus according to the invention.
Figure 2:
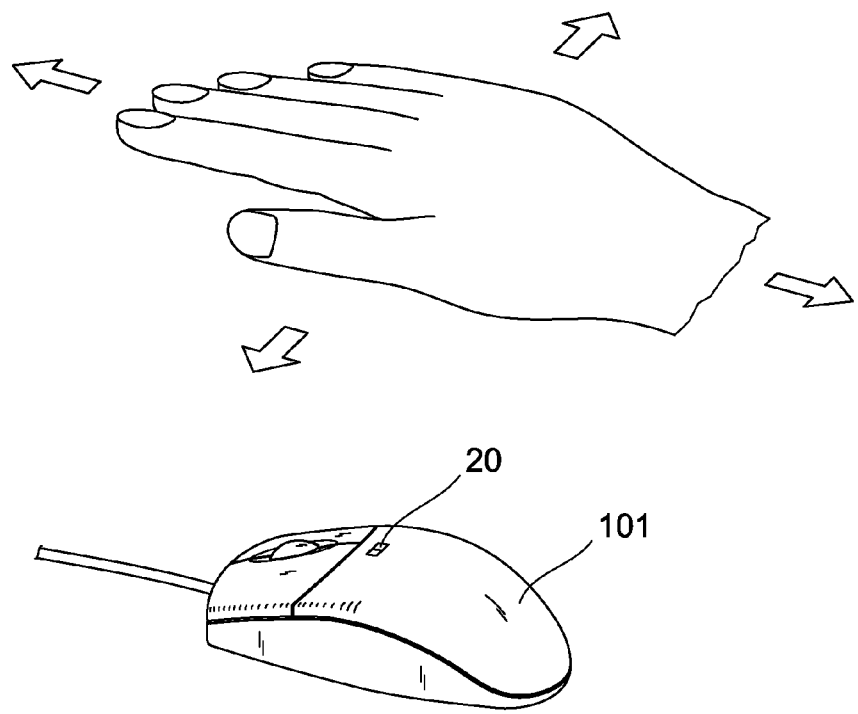
FIG. 2 is a perspective view showing a first preferred embodiment of the invention with the object sensing module disposed on top of a mouse.

Referring to FIGS. 1 and 2, an optical input apparatus in accordance with a first preferred embodiment of the invention comprises an input device 10, an object sensing module 20, a signal processing unit 21, a signal identifying unit 30, a switching unit 40, and a transmission unit 50. Each of the above components will be discussed in detail below.

The input device 10 is implemented as a mouse 101 for indicating what it is pointing to on the screen.

The object sensing module 20 is disposed on a top of the mouse 101 and includes an optical sensor (not shown) and a light source (not shown) which is a light-emitting diode (LED). Alternatively, the light source is capable of emitting invisible light such as infrared (IR) or ultra red light if interference from day light is not desired. The emitted light is directed upward divergently so that an object (e.g., the hand) in a space (i.e., virtual sensing space) above the object sensing module 20 by a predetermined distance range can be sensed by the object sensing module 20. In detail, the hand in the space may deflect light impinged thereon toward the object sensing module 20. The deflected light is received by the optical sensor of the object sensing module 20 and converted into a control signal being representative a homogeneous coordinate including a first horizontal distance (e.g., X-axis), a second horizontal distance (e.g., Y-axis) perpendicular to the first horizontal distanced, and a vertical distance (e.g., Z-axis). The control signal is then sent to the signal processing unit 21 which in turn processes the control signal to translate into a motion of a pointer on a display. Preferably, the optical sensor of the object sensing module 20 is a complementary metal oxide semiconductor (CMOS) sensor which is capable of sensing object(s) in a wide angle.

The signal identifying unit 30 is electrically connected to the input device 10 and the signal processing unit 21 respectively and configured to identify whether the control signal is a hand touching signal or a signal of sensing the hand above.

The switching unit 40 is electrically connected to the signal identifying unit 30 and configured to switch an operation mode of the input device 10 to either a hand touching mode or a hand sensing mode. In detail, after switching the switching unit 40 to the hand touching mode the signal identifying unit 30 identifies the control signal as a hand touching signal of the input device 10 and sends same to the transmission unit 50. Alternatively, after switching the switching unit 40 to the hand sensing mode the signal identifying unit 30 identifies the control signal as a signal of sensing the hand of the input device 10 and sends same to the transmission unit 50.

The transmission unit 50 is electrically connected to the signal identifying unit 30 and configured to receive the hand touching signal or the signal of sensing the hand prior to sending to a computer 60 for further processing. Finally, a pointer (e.g., cursor) moves on the display based on the result of the processing. The transmission unit 50 is a wireless Bluetooth transmitter or a wire Universal Serial Bus (USB) transmitter. All above components are powered by a battery (not shown) and such is conventional technology.

Figure 3:
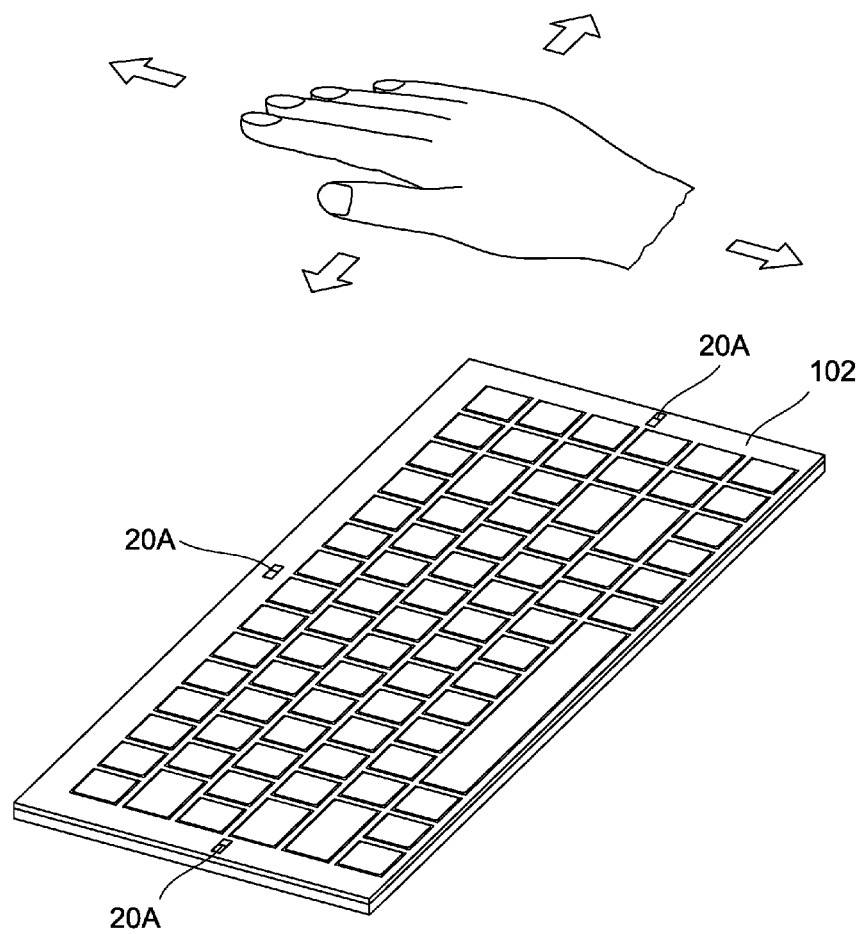
FIG. 3 is a perspective view showing a second preferred embodiment of the invention with the object sensing modules disposed on top of a keyboard.

Referring to FIG. 3, an optical input apparatus in accordance with a second preferred embodiment of the invention is shown. The characteristics of the second preferred embodiment are substantially the same as that of the first preferred embodiment except the following: The input device 10 is implemented as a keyboard 102 for keying alphanumerical data. Three object sensing modules 20A are provided on a top surface of the keyboard 102. Likewise, the emitted light is directed upward divergently so that an object (e.g., the hand) in a virtual sensing space above the object sensing module 20A by a predetermined distance range can be sensed by the object sensing module 20A. The switching unit 40 is configured to switch the operation mode of the keyboard 102 to either a hand touching mode or a hand sensing mode. Alternatively, the input device 10 is implemented as a touchpad (not shown) in another preferred embodiment.

It is envisaged by the invention that two hands are allowed to manipulate the input device or activate the object sensing module from above.

While the invention has been described in terms of preferred embodiments, those skilled in the art will recognize that the invention can be practiced with modifications within the spirit and scope of the appended claims.

What is claimed is:

1. An optical input apparatus comprising:

an input device for providing data and control signals to a computer;

at least one object sensing module disposed on a top of the input device, each of the at least one object sensing module including an optical sensor and a light source;

a signal processing unit electrically connected to the object sensing module, wherein the optical sensor of each of the at least one object sensing module is configured to receive light and convert same into a control signal being representative a homogeneous coordinate of a hand being sensed, and the control signal being sent to the signal processing unit to process;

a signal identifying unit;

a switching unit; and a transmission unit, wherein the signal identifying unit is electrically connected to the input device and the signal processing unit respectively and configured to identify whether the control signal is a hand touching signal or a signal of sensing the hand;

wherein the switching unit is electrically connected to the signal identifying unit and configured to switch an operation mode of the input device to either a hand touching mode or a hand sensing mode;

wherein the transmission unit is electrically connected to the signal identifying unit and configured to receive the hand touching signal or the signal of sensing the hand prior to sending to a computer;

wherein the optical sensor is a complementary metal oxide semiconductor (CMOS) sensor which is capable of sensing at least one obiect wherein the light source is a light-emitting diode (LED);

wherein the input device is a keyboard; and wherein the light source is capable of emitting light upward divergently to create a virtual sensing space there.

* * * * *